Figure 1:
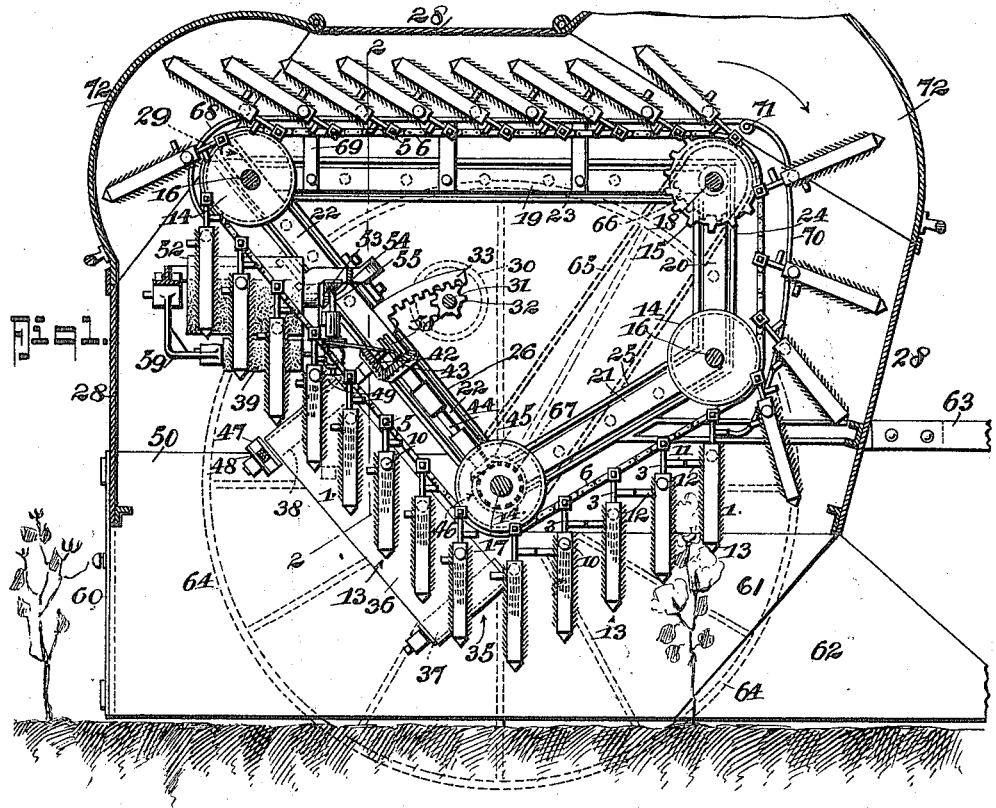

G. C. PHILLIPS.
COTTON PICKING MACHINE.
APPLICATION FILED MAY 25, 1916.

1,197,950.

Patented Sept. 12, 1916.
3 SHEETS—SHEET 1.

WITNESS
John S. Schrott

INVENTOR
George C. Phillips
BY
Fred G. Dieterich
ATTORNEYS

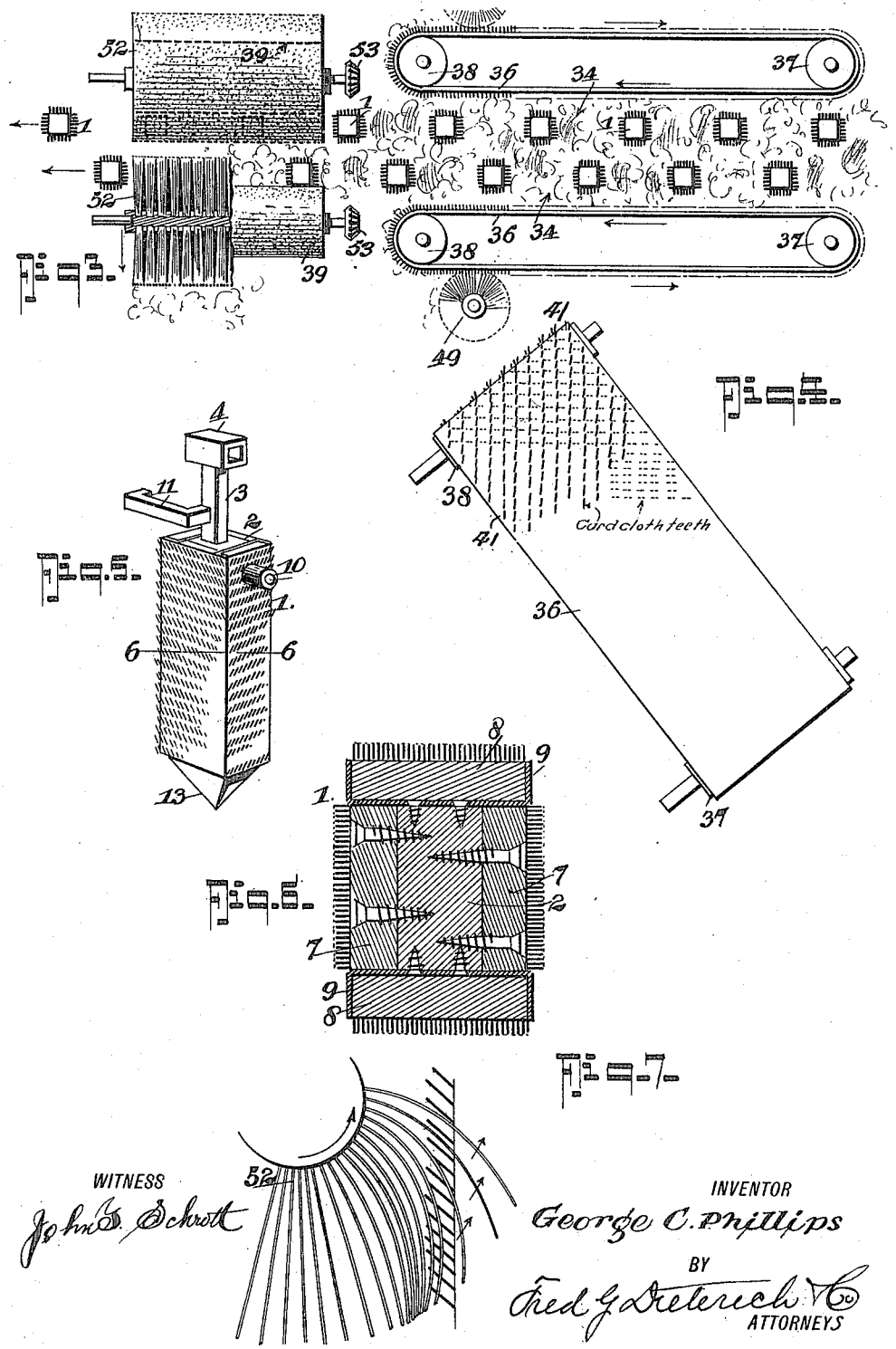

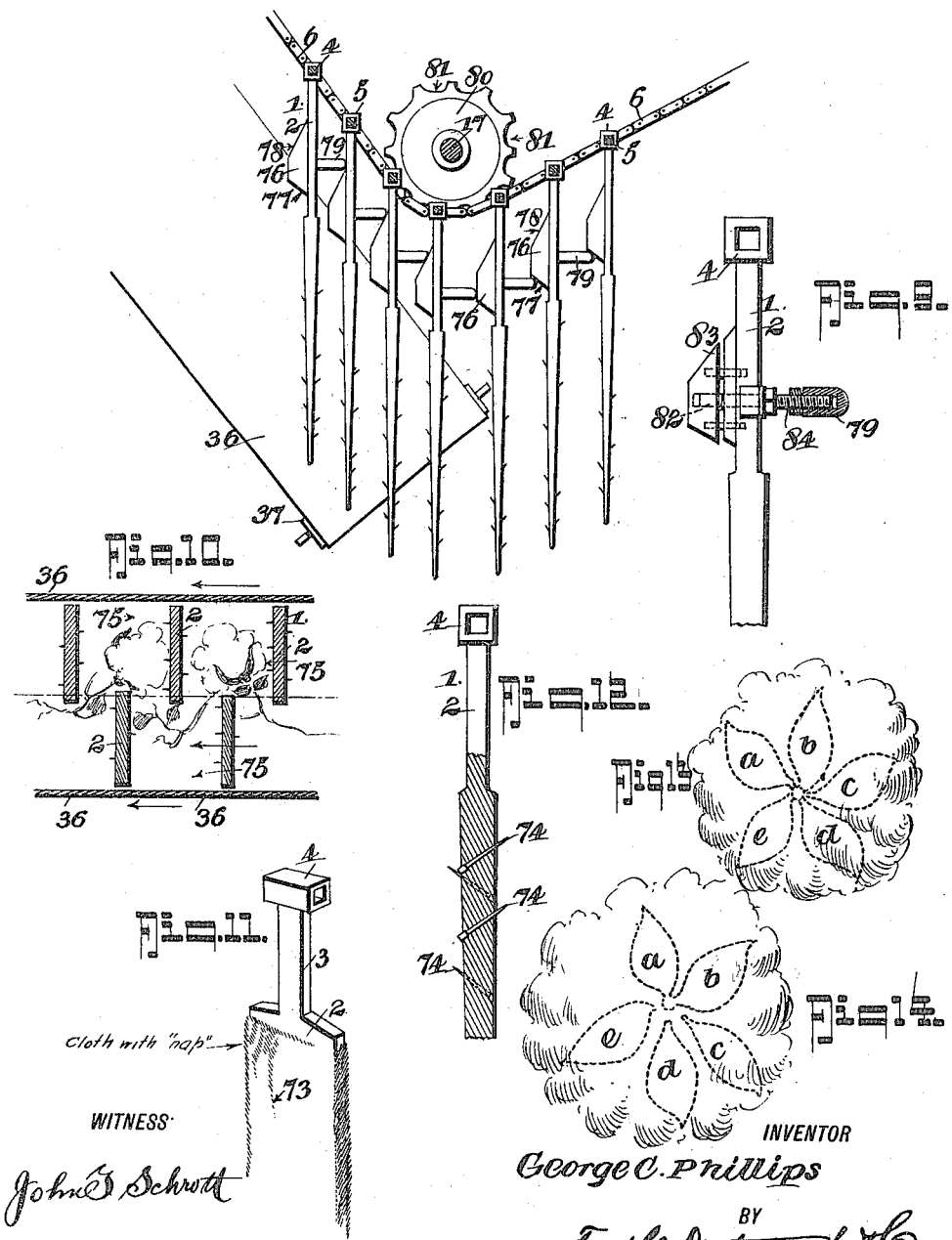

UNITED STATES PATENT OFFICE.

GEORGE C. PHILLIPS, OF BOGALUSA, LOUISIANA.

COTTON-PICKING MACHINE.

1,197,950.  Specification of Letters Patent.  Patented Sept. 12, 1916.

Application filed May 25, 1916. Serial No. 99,807.

*To all whom it may concern:*

Be it known that I, GEORGE C. PHILLIPS, a citizen of the United States, residing at Bogalusa, in the parish of Washington and State of Louisiana, have invented certain new and useful Improvements in Cotton-Picking Machines, of which the following is a specification.

My invention relates generally to improvements in cotton picking machines and specifically to devices for gathering or picking the cotton from the bolls on the plants as they stand on the field.

The present embodiment is an improvement over the Letters-Patent No. 1,100,908 granted to me under date of June 23, 1914.

An object of my invention is to provide a cotton picking machine including a plurality of cotton picking fingers arranged to advance into and recede from the cotton plants in an endless procession, to remove the cotton fibers from the bolls as the machine moves over the field.

A cotton boll consists of a hull which grows to the stem of the plant and contains the fibers and seeds of the cotton. As the boll matures, the hull opens from the top downwardly, into five distinct and cleanly separated segments which gradually spread apart and leave the cotton exposed. When the proper season for harvesting the fully matured cotton fibers is reached, they may be plucked from the hulls.

Another object of my invention is, therefore, to provide a plurality of picker fingers having cardcloth or other suitable surfaces by which the cotton fibers are carded or combed from the hulls.

Instances have occurred where entire fields of fully matured cotton have been left unharvested by reason of the scarcity of labor, etc. At such times, the hulls of the bolls will dry and the segments of the hulls will begin to separate from the stalk of the plant while the cotton fibers naturally adhere to the segments of the hull. Often all of the segments of the hull become detached from the stalk with the exception of one or two and such remaining segments are the only supports of the cotton on the stalk. In such circumstances, the cardcloth surfaced picker fingers are unnecessary since the carding or combing action cannot be accomplished because the cotton and adhering portions of the hull will be lifted bodily from the plant.

Another object of the invention, therefore, is to provide picker fingers having roughened surfaces such as of stout cloth with a strong "nap" or sharp protruding points of brads distributed unevenly over the surfaces of the picker finger.

I have discovered from experimentation with my pickers, such as the one operated substantially as disclosed in my patent before referred to, that situations occur where the teeth of the picker fingers are not adequate for grasping and removing the cotton fibers from the boll and plant. At such times, I have found that a slight pressure against the cotton toward the picker fingers caused the teeth of the picker fingers to catch the cotton fibers and accomplish the true purpose of the machine.

Another object of the invention, therefore, is to provide suitable pressure exerting means disposed adjacent to the ascending side of the picker device adapted to co-act with the fingers in confining the cotton fibers causing the teeth to engage and aid the pickers in their functions.

The hulls of the cotton plant have been found useful in the paper making industry. Heretofore the cost of gathering the hulls has made them unavailable but with this machine by which I am enabled to pass over earlier hand picked or machine picked fields, it has become possible to harvest from ten to twenty acres in a day and thus open another source of income.

Another object of the invention, therefore, is to provide adjusting means which when set causes the picker fingers on the ascending side to automatically come into closer proximity and forcibly remove the hulls from the plants.

Another object of the invention is to provide an improved construction of cleaning brushes for removing the cotton from the fingers and depositing it into adjacent compartments.

Figure 2:
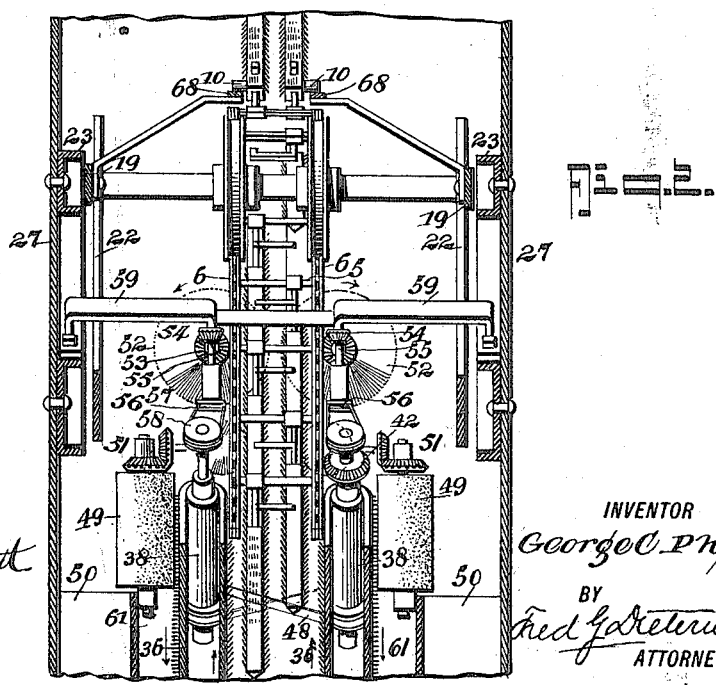

Other objects and advantages will appear from the following specification, reference being had to the accompanying drawings, forming a part thereof, in which:

Figure 1 is a longitudinal section of the device. Fig. 2 is a transverse section on the line 2—2 of Fig. 1. Fig. 3 is a diagrammatic horizontal section illustrating the picking and cleaning actions, and more particularly, the co-acting pressure exerting belts. Fig. 4 is a detail elevation of one of the picker co-acting pressure belts. Fig. 5 is a perspective of one of the picker fingers. Fig. 6 is a cross section on line 6—6 on Fig. 5. Fig. 7 is a diagrammatic view illustrating the cleaning brush action against the adjacent one of the picker fingers. Fig. 8 is a diagrammatic side elevation showing the picker fingers rounding the bottom sprocket, the view also illustrating certain modifications hereinafter to be referred to. Fig. 9 is a detail sectional view showing a modified construction of abutment lugs on the picker finger staff and a means for adjusting the abutments. Fig. 10 is a detail horizontal section showing the manner of hanging the picker fingers of the modified construction. Fig. 11 is a detail perspective of a part of one of the picker fingers showing a covering of stout cloth. Fig. 12 is a detail section of a part of a picker finger showing how a roughened surface may be formed with brads. Figs. 13 and 14 are detail views showing a cotton boll at the maturity and past the maturity of its growth, respectively.

In the drawings, 1 represents the picker fingers, each of which consists preferably of a wooden base 2 in which a shank 3 is suitably embedded. The shank 3 is provided with a head 4 which has a non-circular opening through which a similarly shaped supporting shaft 5 is adapted to pass. The shaft 5 of each of the picker fingers 1, is disposed transversely of the machine and is fulcrumed at its ends, on the endless picker chains 6 in a manner similarly shown and described in my patent before referred to. The shaft 5 forms the support from which the picker finger 1 is pendently hung, as is clearly shown in Fig. 1 of the drawings.

Strips 7 of card cloth are secured to the broad sides of the wooden base 2 of the picker finger 1, similar strips 8 of card cloth being also secured to the narrow sides of the picker finger, (see Fig. 6). The strips 8 are retained in position by suitable sheet metal holders 9 which serve also to protect the edges of the card cloth strips 7. The picker finger 1 in the present embodiment has a card cloth strip on each of its sides which provides four cotton boll engaging and grasping surfaces, in contra-distinction to the two cotton picking surfaces of my former patent. Each of the fingers 1 is provided with a bearing roller 10, at one or the other side, the bearing rollers 10 being arranged necessarily on alternate sides of the successive fingers since the picker fingers are hung in staggered relationship to each other, as shown in Fig. 3. The bearing rollers 10 do not perform any function while the picker fingers traverse the descending and ascending inclines shown in Fig. 1 but serve to prevent the picker fingers from striking the shafts 16 and 18 as the carrier chains 6 move over the sheave 14 and sprocket 15 along the horizontal portion of the course. The rollers 10 engage an adjacent track 68 when this part of the course of the fingers 1 is reached, and the fingers are moved away and held from engagement with the shaft 16.

Each of the fingers is also provided with a pair of abutments, one abutment 11 being located on the shank 3, while the other 12 is located on the body of the picker finger. The abutments 11 and 12 of adjacent fingers, engage during the descending movement, as shown in Fig. 1.

The lower end of the wooden base 2 of the finger 1, may be pointed as at 13 to facilitate the entrance of the finger into the branches of the cotton plant.

The picker chains 6 are supported by sheaves 14 over which they move. The chains also pass over sprocket wheels 15 of which one is shown in Fig. 1, it being obvious that there must be a similar driving and supporting means for each chain 6. The sheaves 14, of which there are three, are mounted on transverse supporting shafts 16 and 17, the shaft 17 being of a greater diameter and acting as the main supporting shaft for the picker mechanism. The sprockets 15 are mounted on a transverse shaft 18 which is located at the upper corners of an inner quadrilateral frame, and this frame consists of oppositely disposed top members 19, front members 20, descending members 21 and ascending members 22. The supporting shafts 16, 17 and 18 are suitably mounted at the corners of the frame in the manner shown in Fig. 1.

Coincident with the four members of the inner frame are the members of an outer frame which consists of the top channel iron 23, the front iron 24, the descending iron 25 and the ascending iron 26. These members of the outer frame are identical at each side of the device and they serve to support the sides 27 of the casing 28, the sides, being secured to the channel irons by rivets or bolts (see Fig. 2).

The shafts 18, 16 and 17 at the front of the machine may have permanent bearings in the channel iron frame since these shafts as well as the members 20 and 21 of the inner frame, remain relatively stationary. The shaft 16 at the rear of the machine must be capable of movement to effect an adjustment of the ascending side of the picker procession and for this reason has no bearing on the outer channel iron frame.

The shaft 16, just referred to, is mounted at its ends, in the adjacent rear ends of the horizontal members 19 of the inner frame. The shaft 16 passes through elongated slots 29 in the upper ends of the ascending frame members 22 and when the parts are in their normal positions, the shaft 16 rests on the bottom of the slots 29, as shown. Since the sheaves 14 and the sprocket 15 are located at the corners of the quadrilateral frame, it is obvious that the endless picker chains 6 move in directions outlined by the positions of the supporting wheels, the figure in this in this instance being that of a trapezium.

The descending side 21 of the inner frame is disposed in such a manner that the descending picker fingers in this region will be separated a suitable distance and cause the picker fingers to easily enter the branches of the cotton plants. The distance of separation in this instance is predetermined and limited by the abutments 11 and 12 of the alternately adjacent fingers. The abutments 11 and 12 engage at this time as shown, and hold the fingers apart an ample distance to permit the card cloth surfaces of the fingers to approach the cotton bolls without dislodging them from the plants. The weight of the picker fingers augmented by the certain degree of rigidity engendered by the engagement of the abutments 11 and 12, imparts sufficient stability to the descending picker finger column, to obviate any tendency to disaline the fingers which the chance engagement of one or more fingers with the branches of the plant, might otherwise accomplish. The upper branches of the plants are usually limber and therefore the construction provided as just described is deemed adequate to serve the purpose.

The angle of the ascending side 22 is more acute than that of the side 21 and serves the useful and essential purpose of bringing the adjacent fingers of the now ascending picker column, into closer relationship, as shown in Fig. 1. The closeness of the picker fingers may be regulated by shifting the members 22, the main shaft 17 in such an instance, acting as a fulcrum.

The members 22 are shifted by turning a handwheel 30 located at one end of a transverse shaft 31, the handwheel being located outside of the casing walls 27. A pinion 32 engages a segmental rack 33 mounted on each one of the inner frame members 22 so that when the hand wheel 30 is turned in one direction, the frame members 22 will move a corresponding degree.

It will be observed in Fig. 1 that the frame members 22 are fulcrumed on the main shaft 17. When the hand wheel 30 is turned, the rack 33 and the attached frame members 22 will move through an arc of a circle of which the shaft 17 is the center. The movement of the frame members 22 causes the displacement of the shaft 16 which passes through the slots 29 in the end of the frame members 22. The displacement of the shaft 16 causes the frame members 19 which are fulcrumed on the shaft 18, to move upwardly. The picker fingers of the ascending column will then be caused to approach each other more closely and grip the cotton fibers more tightly when the picker column turns about the lower sheave 14. The picking of the cotton boll from the plant is thus insured; the sharper the angle of the ascending column, the closer will the fingers hang and consequently the more secure will be the grip of the fingers 1 on the cotton bolls when the fingers turn the bottom sheave 14.

The upward movement of the members 22 will cause the horizontal frame members 19 to move upwardly, the forward shaft 18 acting as a fulcrum. The rear shaft 16 will thus be caused to advance within the slot 29 as will readily be apparent.

Reference to Fig. 3 will disclose the staggered arrangement of the successive ones of the members 1 of the picker column. This arangement produces, what may be termed a pocket as at 34, these pockets occurring alternately. At that time in the advance of the picker column, when the fingers 1 traverse the descending angle of the frame as at 21, the bolls of the cotton will enter and fill the pockets 34, loosely. But when the turning position 35 (Fig. 1) is reached, the cotton bolls are promptly grasped tightly and plucked from the plants. The plucking act is accomplished in part by the approaching of the adjacent fingers as previously explained, and completed by a pair of pressure exerting belts 36, as shown in Fig. 3.

Each of the belts 36 travel over a lower pulley 37 and an upper pulley 38 and the belts are disposed at an angle approximately that of the ascending picker finger column. By reference to Fig. 1, it will be observed that the lower belt pulley 37 is located just at the approach to the ascent of the picker column and that the belt ends at the picker cleaning brushes 39 where it moves around the upper pulley 38. The purpose of this arrangement is to exert a pressure against the cotton in the pocket 34 as soon as the column begins the ascent. The action of the pressure belts 36 may be likened to a wedge action and it serves to pack the cotton into the pockets and onto the teeth of the card cloth surfaces, so that the dislodgment of the bolls from the plants is assured.

The belt 36 may be made of a suitable material but is provided with an outer card cloth surface. The teeth 41 of the card cloth are disposed diagonally of the belt as indicated in Fig. 4. The teeth are upwardly inclined on the surface of the belt nearest the picker finger column and the purpose of this provision is to assist in the cotton picking action. This is possible since the belt and the picker finger travel the ascent at the same speed. Since the teeth of both the card cloth surfaces of the belt and the picker fingers are inclined upwardly and inwardly, the plucking of the cotton is facilitated.

Reference to Fig. 4 shows the position of the card cloth teeth 41 on the upgoing side of the belt, the teeth being disposed at an upward inclination as previously pointed out. However, as the belt 36 turns around the pulley 38 and moves downwardly again, the teeth 41 remain in the vertical position, no longer. The teeth 41 then assume a horizontal position, as shown in Fig. 4, this position being advantageous to the coöperation of individual belt cleaning brushes 49. The brush 49, of which there is one for each belt, is disposed vertically and rotated in the general direction of the downgoing side of the belt 36 so as to sweep the adhering cotton fibers from the belt into the adjacent compartments 50. The brushes 49 are rotated by suitable bevel gear connections 51, the motion being driven from the adjacent shaft of the primary cleaning brush 39, presently to be referred to.

The shaft of one of the upper pulleys 38 is provided at its upper end with a bevel pinion 42 which engages the bevel gear 43 of an auxiliary drive shaft 44. The shaft 44 is held in suitable bearings and is provided at its other end, with a driven gear 45 which meshes with a drive gear 46 on the main shaft 17. The shaft of each of the upper pulleys is provided at its lower end with a belt pulley 47 each of which receives the crossed belt 48. The motion of the directly driven belt pulley, as shown in Fig. 1 and previously described, is thus imparted to the companion belt pulley but of necessity, in the opposite direction, as shown in Fig. 2.

The primary cleaning brush 39, of which one is provided for each set of picker fingers, as shown in Fig. 2, is composed of short bristles. The purpose of this brush is to remove the cotton from the adjacent side faces of the advancing picker fingers 1, as shown in Fig. 3. Situated immediately above the brush 39, is a secondary cleaning brush 52 and it is composed of long bristles. The purpose of the brush 52, is to sweep between the picker fingers 1 and clean the adhering cotton from the side faces 7, as shown in Fig. 3. The bristles of the brush 52 are made of quite flexible material so that as they engage the adjacent end faces of the picker fingers 1, these bristles will not break nor separate but will yield, as indicated in Fig. 7.

The primary and secondary cleaning brushes 39 and 52 are rotated in the same directions on their respective sides of the machine. For this purpose, the shaft of each brush has a bevel pinion 53 with which the bevel gears 54 of a counter shaft 55, engage. The counter shaft 55 is driven by a belt 57 which engages a pulley 56 on the lower end of the counter shaft. The belt engages a similar pulley 58 on the upper end of the shaft of the adjacent belt pulley 38, as shown in Figs. 1 and 2. The gear arrangements as described serve to rotate the cleaning brushes in the proper directions to sweep every particle of cotton from the picker finger surfaces, into the cotton compartments 50.

The cleaning brushes 39, 52 and 49 are supported by a suitable frame 59. The frame 59 is attached to the members 26 of the outer quadrilateral frame and is held in the one position.

Access is had to the compartments 50 through doorways which are normally closed by doors 60. It will be observed that the sides of the compartments 50, form continuations of the relatively narrow passage 61 through which the cotton plants pass. The passage 61 is widened at the front as at 62, to receive the cotton plants as the machine travels over the cotton field. The machine is drawn by a tongue 63 which is securely braced to the casing 28. The machine is mounted on wheels 64, as shown.

Referring again to the picker finger mechanism, it will be observed in Fig. 1, that the shaft 18 of the sprocket 15 is driven by a chain 65. The chain 65 engages a sprocket 66 on one end of the shaft 18, and a driving sprocket 67 on the main shaft 17. The picker chains 6 are thus continuously kept in motion as the picker machine is drawn over the field. The manner of entrance and exit of the picker fingers 1 into the cotton plant have been previously described and it will be apparent that the fingers must be held in a position such as shown in Fig. 1, after the fingers have once been cleaned, so as to allow the fingers 1 to pass the upper shaft 16 and 18 without conflicting with them. The means for accomplishing this end is fully disclosed in my prior patent referred to and as has been stated consists generally of a track 68 with which the rollers 10 of the picker fingers 1 engage as the fingers are about to move over the sheave 14. The track 68 is supported by brackets 69 and is hinged to the front fixed portion 70 of the track as at 71. This hinged connection compensates for any displacement when the inner quadrilateral frame is adjusted. Access to the interior of the casing 28 is had through doors 72.

The construction of the picker fingers as just described is adapted more particularly for effecting the carding or combing of the cotton fibers from the bolls when the cotton is being harvested at its maturity. The same picker fingers may, of course, be used to harvest cotton which has passed the stage of its maturity but, as previously explained, at this stage, the carding action is no longer effected since portions of or entire ones of the hulls are detached with the cotton and carried into the cotton storing compartments. In endeavoring to anticipate the needs of this particular situation, I have found that a simple wooden paddle as shown at 2 in Fig. 11, covered with a stout cloth 73 with a strong "nap" will serve the purpose of lifting the cotton bolls from the stalks of the plants. Any roughened surface that will keep the cotton from slipping easily from between the paddles will answer the purpose. Another simple manner of roughening the surfaces of the paddles 2 is to drive brads 74 diagonally through the body of the paddles so that the points project at opposite sides, as shown in Fig. 12. The brads need not be disposed over the surface with precision but may be driven promiscuously, as shown in Fig. 8.

By reference to Fig. 10, it will be noted that it is possible to omit the medial space between the picker fingers, as shown in Fig. 3, and bring the adjacent edges of the fingers to the center line or even allow them to overlap slightly. Individual pockets 75 are thus formed and these may easily be varied in size by the adjusting devices described in connection with Fig. 1. With the arrangement now under consideration, the pressure exerting belts 36 may be made of lighter material other than card cloth, since card cloth may be found to be unnecessary to use. In the form shown in Fig. 10, the surfaces of adjacent picker fingers are close together and the upper limbs of the cotton plants may pull through as indicated. The enforced engagement of the upper portions of the plants is advantageous to the removal of the entire hull as has previously been pointed out.

In Figs. 8 and 9, I show a modified construction of picker abutments on adjacent fingers. The abutments consist of a base block 76 which is located on one side of the staff 3 of each picker 1. The base block has an abrupt decline 77 at its lower side and a gradual decline 78 at its upper side. Mounted on each staff 3 oppositely to the base block 76, is a stud 79 which co-acts with the base block of the adjacent picker finger. When the fingers are on the descending side, (see Fig. 8) the studs 79 engage the abrupt surfaces 77 of the adjacent base blocks and thus hold the fingers relatively widely separated.

When the fingers ascend, the point of engagement of the studs 79 is changed from the surfaces 77 to the surfaces 78 of gradual decline, thus spacing the pickers at relatively small distances. The points of engagement of the studs 79 are changed from below to above the base blocks 76 just after the carrier chain 6 rounds the sprocket 80. The sprocket 80 is of a peculiar construction in that certain ones of the teeth are arranged rectilinearly instead of coinciding with a pitch line described from the center of the sprocket. In the present showing (Fig. 8) there are four such sets of rectilinearly arranged teeth, two of the sets being indicated generally at 81. The sprocket 80 may thus be defined as having "flat" sides, the flat sides occurring at the regions 81 which are occupied by the rectilinear teeth as just explained. Chain 6 may be applied to the sprocket 80 sufficiently loose to prevent binding and yet be sufficiently taut to prevent it from disengaging the sprocket. Each of the "flat" sides of the sprocket 80 coacts with one of the ascending pickers and as the chain 6, moves over the "flat" side the picker will move in a substantially horizontal plane a distance equal to the "flat" side of the sprocket. This will cause the stud 79 to disengage the surface 77 and come into contact with the straight vertical surface of the block 76, as shown in Fig. 8. When the chain then begins to ascend, the point of engagement of the stud 79 will again be changed, this time to the inclined portion 78 of the base blocks 76 and the pickers will approach each other more closely.

The slight deviation of the movement of the pickers occasioned by the movement of the chain along the "flat" side of the sprocket 80 first causes the stud 79 to depart from the region of the surfaces 77. When the chain now traverses the course of the acute angle of the ascent after leaving the sprocket, the stud 79 of each picker will contact the upper or gradually inclined surface 78 of the base block.

When adjustments of the quadrilateral chain bearing frame are made to lessen the acuteness of the ascending side, the studs 79 in changing positions of engagement with the blocks 76, will engage the surfaces 78 at points proportionately nearer the crown of the base blocks. The picker fingers will thus automatically space themselves. The same action takes place at the descending side but the co-active automatic adjustment occurs between the studs 79 and the surfaces 77 as will readily be understood.

The base block 76 and studs 79 may be adjustably mounted if such a provision is desirable. In Fig. 9, I have shown the base block 76 separated centrally, an adjusting screw being suitably arranged to move the separated portion of the block. Dowel pins 83 prevent the free portion of the block from turning. The stud 79 is similarly mounted on a bolt 84 and suitable check nuts hold the free portion of the stud to its adjustments.

While not absolutely necessary to the disclosure of my invention, yet desirable for a clear understanding of the conditions under which my device is operated, I have shown two views of the cotton boll as when they are to be harvested. Fig. 13 shows a cotton boll at the maturity of its growth. When the cotton boll is in this condition, the segments *a*, *b*, *c*, *d*, and *e* of the hull are all attached to the stalk of the plant and the card cloth covered picker fingers shown in Fig. 1 are then used to card or comb the fibers from the hull. But when the growth of the boll passes maturity, it appears as shown in Fig. 14 in which the segments *c*, *d* and *e* have become detached from the stalk leaving the segments *a* and *b* to support the cotton above. When this condition is reached by the cotton, the picker paddles need only have a sufficiently roughened surface to prevent the cotton from slipping, to detach the cotton from the supporting segments *a* and *b*. The pickers shown in Figs. 8, 9, 10, 11 and 12 are adapted to meet this latter condition, since they are constructed with a view of simply lifting the cotton with the attached segments from the remaining portions of the hull, and not to accomplish any combing action as do the pickers of Fig. 1.

The essential features in the present invention consist of the pressure exerting belts; the approximately vertical descent and ascent of the picker fingers among the cotton bolls; the different and automatic spacing of the descending and ascending pickers and the raising of the limbs to pass a contracted space. It also consists in the finger and belt cleaning brushes and while the disclosure made, is that of a preferred form, it is obvious that various modifications in the constructions may be made without departing from the spirit of the invention or the scope of the claims.

What I claim is:

1. In a cotton picker; the combination of a wheeled carrier, an endless movable picker supporting chain including a descending and an ascending side, picker members pendent from the chain, the picker members having roughened surfaces to hold cotton fibers, and flexible means adapted to exert pressure on the cotton bolls and coöperative with the picker members on the ascending side.

2. In a cotton picker; the combination of a wheeled carrier, picker fingers having coarse jagged surfaces of varying degree; an endless movable picker chain supporting the picker fingers, the chain including a descending portion adapted to thrust the pickers into the plants and an ascending portion adapted to withdraw the pickers from the plants; and constantly moving means adapted to exert pressure on the cotton bolls and coöperative with the pickers on the ascending side.

3. In a cotton picker; the combination of a wheeled carrier, picker fingers having coarse jagged surfaces of varying degree; an endless movable picker chain supporting the picker fingers, the chain including a descending portion adapted to thrust the pickers into the plants and an ascending portion adapted to withdraw the pickers from the plants; automatic adjusting means on the opposing faces of the pickers for holding the pickers on the descending side spaced at relatively fixed distances apart coöperative with the pickers on the ascending side.

4. In a cotton picker; the combination of a wheeled carrier, picker fingers; an endless picker chain supporting the picker fingers, the chain including a descending portion adapted to thrust the pickers into the cotton plants, and an ascending portion adapted to withdraw the pickers from the cotton plants; means for moving the chain, means coöperative with the pickers on the ascending side for exerting a pressure on the cotton bolls, and means coöperative with the pickers on the ascending side for removing the cotton from the picker fingers.

5. In a cotton picker; the combination of a wheeled carrier, picker fingers including a forward downwardly advancing column adapted to enter the plants and a rearward upwardly receding column adapted to withdraw from the plants, means on adjacent picker fingers for spacing the pickers in the descending column a predeterminedly fixed distance, said means permitting a change in the spacing as the pickers traverse the ascending column, the pickers then falling in closer proximity; and means for effecting said change.

6. In a cotton picker; the combination of a wheeled carrier, picker fingers including a forward downwardly advancing column adapted to enter the plants and a rearward upwardly receding column adapted to withdraw from the plants, means on adjacent picker fingers for spacing the pickers in the descending column a predeterminedly fixed distance, said means permitting a change in the spacing as the pickers traverse the ascending column, the pickers then falling in closer proximity; means for effecting the change, and means coöperative with the ascending column for erecting the column to increase the proximity of the picker fingers.

7. In a cotton picker; the combination of a wheeled carrier, picker fingers including a forward downwardly advancing column adapted to enter the plants and a rearward upwardly receding column adapted to withdraw from the plants, means on adjacent picker fingers for spacing the pickers in the descending column a predeterminedly fixed distance, means for shifting the points of engagement as the pickers approach the ascending column and causing the pickers to fall in closer proximity, adjusting means coöperative with the ascending column for erecting the column to increase the proximity of the fingers, and a pressure exerting means for pressing the cotton into contact with the picker fingers.

8. In a cotton picker; the combination of a wheeled carrier, picker fingers, an inner quadrilateral frame including a forward downwardly inclined fixed portion and a rearward upwardly inclined movable portion, a picker chain following the contour of the frame portions, the picker fingers being supported by the chain, lugs and base blocks on the adjacent picker fingers adapted to engage at certain points as the fingers traverse the obtuse angled portion, said lugs and base blocks engaging at other points as the fingers traverse the acute angled portion, the pickers then falling in closer proximity, means for effecting the change, a rack on the movable frame portion, a pinion engaging the rack, and an operating shaft for erecting the movable frame portion to increase the proximity of adjacent picker fingers.

9. In a cotton picker; the combination of a wheeled carrier, opposed endless picker chains of quadrilateral disposition including a forward descending portion and a rearward ascending portion, picker fingers having cardcloth surfaces pendent from the chains in staggered relationship to form alternate spaces, abutments on adjacent fingers for spacing the fingers a relatively great distance while the picker finger column traverses the descent, means for disengaging the points of engagement of the abutments to space the fingers a relatively small distance when the column traverses the ascent, a pressure exerting belt coöperative with the ascending column at each side to press the cotton fibers into the aforesaid spaces and brushes for removing the fibers.

10. In a cotton picker; the combination of a wheeled carrier, a moving column of picker fingers having teeth disposed in alternate adjacent relationship including a forward descending portion and a rearward ascending portion, a suitable support for the said moving column of fingers, engageable lugs on adjacent pickers to space the pickers of the descending portion of the column, belts for exerting a pressure to force the cotton into engagement with the teeth of the pickers as they traverse the ascending portion of the column, and means for disengaging the engagement of the lugs to increase the proximity of the fingers and narrow the spaces therebetween, brushes for cleaning the belts, and brushes for cleaning the pickers.

11. In a cotton picker; the combination of a wheeled carrier, an ascending column of picker fingers having upwardly inclined teeth, the fingers being in staggered relationship to form cotton pockets on alternate sides of a central axis, a suitable support for the column of picker fingers and pressure exerting belts disposed coincidently with the picker finger column, the said belts having upwardly inclined teeth that travel adjacent to the picker fingers.

12. In a cotton picking mechanism of the character described, the combination with a wheeled carrier and an ascending column of picker fingers having upwardly inclined teeth, means for supporting the fingers, the said fingers being in staggered relation to form pockets on alternate sides of a central axis, flexible belts having toothed faces held under pressure toward the opposite sides of the aforesaid column of picker fingers and rotary picker cleaner brushes between which the ascending column of picker fingers pass.

13. In a cotton picking mechanism of the character stated, the combination with a wheeled carrier and an ascending column of picker fingers having opposite end and opposite side faces covered with cardcloth, means for sustaining the said column of picker fingers, primary cleaning brushes for engaging the opposite sides of the picker fingers and secondary cleaning brushes that engage the opposite ends of the picker fingers as the latter rise up with the adhering fibers on their cardcloth surfaces.

14. In a cotton picker; the combination of endless opposed picker chains, a transverse non-circular shaft between the chains, the shaft having trunnions for mounting in the chains, a base, a shank embedded in the base, the base having a pointed lower end, a non-circular head on the shank connectible with the shaft, card-cloth surfaces on the base, and oppositely positioned spacer lugs one on the shank and one on the base.

15. In a cotton picker; the combination of an endless picker chain, a base rockably pendent from the chain, the base having broad and narrow sides and being pointed at the lower end, card cloth strips secured to the broad sides of the base, metallic protecting members secured to the narrow sides of the base, and cardcloth strips secured to the protecting members.

16. In a cotton picker, the combination of an endless supporting picker chain including a downwardly inclined portion and an upwardly inclined portion, pickers pendently supported from the chain in staggered relation, a base block on one side of each of the pickers, said block having an abrupt inclined surface at the bottom and a gradual inclined surface at the top, a lug on the other side of each picker for engaging the abrupt incline of the base block of an adjacent descending picker whereby to hold the pickers spaced apart, means for changing the point of engagement of the lug from the abrupt inclined surface of the block to the graduated inclined surface of the said block when the pickers approach the upgoing path, and means for moving the pickers.

17. In a cotton picker the combination of an endless supporting picker chain that includes an upwardly inclined portion and a downwardly inclined portion, picker fingers pendent from the chain and held in staggered relation, a base block on one side of each of the picker fingers having an abrupt inclined surface at the bottom and a graduated inclined surface at the top, a lug on the other side of each picker finger for engaging the abrupt incline of the base block of an adjacent picker finger on the downgoing portion of the chain to space the picker fingers a relatively fixed distance apart, a sprocket wheel having flat peripheral sides which when engaged by the endless supporting picker chain effects the shifting of the lugs from the abrupt inclined surface of the base block to the graduated inclined surface of the base block of the adjacent picker fingers, and means for moving the picker fingers.

GEORGE C. PHILLIPS.

Copies of this patent may be obtained for five cents each, by addressing the "Commissioner of Patents, Washington, D. C."